Patented Dec. 25, 1928.

1,696,546

UNITED STATES PATENT OFFICE.

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE.

CATALYTIC OXIDATION OF SULPHUR DIOXIDE.

No Drawing. Application filed February 15, 1926. Serial No. 88,488.

This invention relates to the catalytic oxidation of sulphur dioxide, and, more particularly, to the catalytic oxidation of sulphur dioxide in the presence of base exchanging silicate catalysts containing both catalytic cations and anions.

In our co-pending application, Serial No. 88,487 filed February 15, 1926, we have described processes of oxidizing sulphur dioxide in the presence of catalytically active zeolites or their pseudomorphous dehydration products, in which zeolites at least part of the catalytic elements are combined in a form in which they are not removable by base exchange. In our co-pending application, Serial No. 86,652, filed February 6, 1926, we have described the process of oxidizing sulphur dioxide in the presence of zeolite catalysts or their pseudomorphs, which zeolites are combined with catalytically active acid radicals, but which do not contain catalytically active elements in a non-exchangeable form, the untreated zeolites being themselves either catalytically inactive or possessing feeble catalytic power and being far too weak for effective use in the catalytic oxidation of sulphur dioxide.

The present invention constitutes an improvement on our two prior applications, above referred to, and has for its object a still greater enhancement of catalytic efficiency of the processes described in our co-pending applications. With this and other objects in view, the present invention consists in its broader aspects in combining catalytically active acid radicals with zeolites which are themselves powerful catalysts and which contain catalytically active elements in a non-exchangeable form. Thus, the present invention combines the two types of highly effective catalysts, namely, those in which catalytically active elements are present in non-exchangeable form, and those in which catalytically active acid radicals are combined with the zeolite. The products possess the advantages of catalysts containing both of the two types of catalytic elements, but the total effect in catalytic efficiency is greater than that of the sum of the two components.

The high efficiency of the catalysts of the present invention is in part due to the physical structure of the zeolites and their pseudomorphic dehydration products having a composition analogous to nepheline, leucite, felspars and the like, which structure is finely porous and honey-comb-like, and in many cases the porosity is micronic or submicronic. This physical structure, which appears to be an important cause of efficiency in the catalysts of the present invention and also in the catalysts of our co-pending applications, above referred to, permits an exceedingly fine division of the catalytic elements coupled with an enormous surface exposed to the reaction gases. We are of the opinion that the gas pressure in the minute pores, owing to the high surface energy of pores having an average pore diameter of a micron or less, is considerably higher than the pressure existing in the converter as a whole and that this is an important factor in the effectiveness of the catalysts of the present invention.

We have also noted in our co-pending applications, above referred to, that $SiO_2$, particularly in the form of more or less hydrated silicic acid, appears to act as a catalyst activator and enhances the activity and efficiency of the catalytic elements incorporated in the zeolite, although $SiO_2$ itself has but little, if any, actual catalytic power.

The high resistance of the zeolites and their pseudomorphs to high temperatures is an added factor in their effective use in the oxidation of sulphur dioxide, as it not only increases the durability of the catalysts at ordinary operating temperatures, but makes it possible to use temperatures which are considerably higher than those possible with the ordinary catalysts containing elements of the fifth, sixth and seventh groups of the periodic system used in the prior art and which tend to sinter or otherwise lose their activity at temperatures considerably below 580° C. The zeolite catalysts of the present invention, however, may be used at temperatures higher than those practicable with those non-platinum catalysts hitherto used and may even be used at temperatures up to and above 580° C. High temperatures, moreover, mean a more rapid catalysis and increase the overall efficiency of the catalyst by permitting a more rapid gas flow. This is a remarkable advantage inherent in the catalysts of the present invention.

The chemical combination of catalytically active elements in non-exchangeable form and catalytically active acid radicals combined with the zeolites appears to play an important part in the catalytic efficiency of the zeolites. We have not determined the exact chemical combination of the catalytic components present, but we are strongly of the opinion that they form one or more chemical compounds of great molecular weight and may be considered as highly complex molecular combinations of a salt-like nature. It seems almost certain that some more or less definite chemical compound or compounds are formed, since the catalytic activity of the zeolites of the present invention is far higher than that of the corresponding amount of the catalytic components in their free state and is also higher than the catalytic effectiveness of the corresponding amount of zeolites in which the catalytically active elements in non-exchangeable form and the catalytically active acid radicals are separately present. This greatly increased efficiency is all the more surprising since the catalytic elements, and particularly the elements which are present in non-exchangeable form, are undoubtedly chemically combined and are greatly diluted and one might almost say "shielded" by the large amounts of relatively inactive $SiO_2$ present in the zeolite.

The above explanations of the reasons for the great efficiency of the catalysts of the present invention, which is fully equal to that of the best platinum catalysts hitherto used, constitutes the best explanation which we know. The features of the chemical and physical structure of the zeolites are, however, not yet proven and the invention is in no sense limited to the above explanation.

The catalytically active elements which are present in the zeolites in non-exchangeable form may be of the most various nature such as vanadium, molybdenum, tungsten, uranium, chromium, manganese. We have found that metal elements of the fifth, sixth and seventh groups of the periodic system are particularly efficient and vanadium has proved to be up to the present the most effective single catalytic component, although chromium, tungsten and molybdenum are but little inferior. Mixtures of two or more catalytic elements may also be present and in many cases the zeolite containing a mixture of catalytic elements in non-exchangeable form is more effective than one which contains only a single element. The invention includes catatalytic zeolites which contain either a single catalytic element or a mixture.

In addition to the highly active catalytic elements, other elements which appear to have an activating effect, although themselves catalytically inactive or weak, may be present. Such elements are aluminum, iron, zinc, silver, copper, nickel, cobalt, boron, rare earths and the like. They may be present either singly or in mixtures. $TiO_2$ may also be present in non-exchangeable form and is in some cases desirable.

In addition to the elements which are present in non-exchangeable form, the zeolites may contain other bases in exchangeable form, which bases may be either catalytically inactive, such as the alkali metals and the alkaline earth metals, or may have slight catalytic powers or act as activators. For example, zinc, aluminum, zirconium, cerium, thorium, titanium, chromium, tungsten, uranyl, vanadyl, manganese, iron, nickel, cobalt, copper, silver, gold, etc., may be incorporated in exchangeable form.

The elements which are present in non-exchangeable form may be in different stages of oxidation or valence. Thus, for example, we have found that vanadium in a lower stage of oxidation corresponding to vanadyl compounds, appears to possess a greater catalytic power than vanadium in a higher stage of oxidation, and zeolites containing vanadium in a lower stage of oxidation than that corresponding to vanadic acid are among the most efficient which we have produced.

The catalytically active acid radicals which are combined with the catalytic zeolites to form the contact masses of the present invention may be introduced by means of the acids themselves, particularly where these are soluble, or by means of salts. Among the catalytically active acid radicals are the following acids: vanadic acid, tungstic acid, uranic acid, chromic acid, molybdic acid, manganic acid, titanic acid, and the corresponding per- and poly-acids. Complex mixtures of these catalytically active acid radicals or their salts may be used and various mixtures, as well as single acids, may be introduced into the zeolites either by simultaneous or successive treatments. The invention includes zeolites containing single acids as well as those containing any and all mixtures.

The molecular quantity of the acid radicals introduced may be varied so that the resulting compounds with the zeolites are acid, neutral or basic in character. This is an additional reason for believing that the acid radicals form some complex salt like compound with the zeolites or components of the zeolites. It should be understood that the word "zeolite" as used in the specification and the claims is intended to cover not only those polysilicates which exchange their bases with great rapidity in the presence of metal salt solutions and which are commonly referred to as zeolites, but also includes those pseudomorphic dehydration products which retain the physical structure of the zeolite but exchange their bases with much greater reluctance. For the purpose of the present invention, these two classes of compounds are substantially equal as raw materials and the term "zeolite" is used to cover both classes and is to be so understood.

The catalytically active zeolites, above described, either singly or in mixtures, may be used directly as contact masses in the contact sulphuric acid process. We prefer, however, in most cases, to dilute or mix the highly active zeolite catalysts with inert carriers or with carriers which possess slight catalytic power or act as catalytic activators either by reason of their physical structure (sub-micronic porosity, etc.) or by their chemical composition (materials containing $SiO_2$ in the form of hydrated silicic acid).

Examples of carriers are sand, pulverized rocks rich in quartz, powdered glass, pumice meal, asbestos meal or fibres, kieselguhr, silica, pumice stones, diatomaceous stones, filter stones, quartz, etc.

Instead of finely divided carriers, the catalysts, with or without admixture of finely divided carriers, may be coated on more massive fragments, such as fragments of acid-resistant minerals or rocks and the like. Catalytically active massive carriers may also be used, as for example, roughened metals and metal alloys which possess catalytic powers, such as chromium, ferro-chromium, ferro-vanadium, ferro-molybdenum, ferro-silicon-manganese, ferro-silicon-aluminum-manganese, ferro-manganese, ferro-titanium, ferro-tungsten, ferro-nickel, ferro-chrome-nickel and the like.

Other catalytically active carriers may also be employed such as burnt pyrites, rutile, ilmenite, titaniferous iron ore, manganese oxide, chromium oxide, bauxite, copper oxide, nickel oxide, cobalt oxide, barium oxide and the like.

The contact masses may be treated with burner gases before use in the contact sulphuric acid process, but, if desired, this preliminary treatment may be omitted and the contact masses may be at once filled into the converters and burner gases of various concentration passed through at 380–450° C., whereupon in a short time the contact process will commence and almost theoretical yields can be obtained at ordinary gas velocity or even in some cases at higher gas velocities than are usually practicable.

The great resistance of the contact mass to high temperatures permits operation even up to and somewhat above 580° C. with a corresponding great increase in gas velocities without seriously affecting the catalyst's activity.

The contact masses of the present invention are fully equal to the platinum contact masses used hitherto and can be used as a complete substitute for platinum. They may be used, however, in combination with other catalysts, either platinum or non-platinum, in the form of preliminary or final contact masses or in admixture with the other types of contact masses. It is frequently of advantage to arrange contact masses in layers with or without an increase in catalytic activity in the direction of the gas flow and the catalysts of the present invention may be so employed, either alone or in admixture with catalysts of different types. Other and further variations will be obvious to those skilled in the art, and are included in the present invention.

The following specific examples set out in detail processes of making and using a number of representative catalysts and contact masses embodying the improvements of the present invention, but the invention is in no sense limited to the details of the specific examples, nor to the choice and arrangement of the catalytic elements therein set forth.

*Example 1.*

100 kg. of a sodium vanadium polysilicate, in which vanadium is present in non-exchangeable form, is treated at an elevated temperature with a 5–10% silver nitrate solution by agitating the zeolite in the solution or permitting the latter to trickle over the zeolite until the base exchange is complete. The silver-vanadium-zeolite thus formed is washed and is then treated with a 10% sodium vanadate solution, forming the so-called vanadate of the silver-vanadium-zeolite. This product is then thoroughly washed out and dried at temperatures below 100° C. and broken into fragments of the size of a pea and is then ready for use.

The contact mass is extraordinarily resistant to high temperatures and high or low percentage $SO_2$ gases can be used with good effect. The silver can be substituted by nickel, cobalt, copper, iron, manganese, chromium or the like, or mixtures of these elements can be introduced by base exchange. On treatment with a soluble vanadate solution, similar highly active contact masses can be obtained.

The concentrated catalysts described above can also be diluted by pulverizing in a ball mill and then coating on quartz fragments or fragments of acid-resistant minerals, burnt pyrites, roughened metals or metal alloys. A small amount of potassium silicate can be used as a cementing agent.

The initial vanadium zeolite can be prepared either by processes involving melting of the components or by wet processes. If the latter are used, the finely divided diluents may advantageously be incorporated into the vanadium zeolite during its formation. Thus, quartz powder, ground asbestos, celite, iron oxide, copper oxide and the like, may be stirred into the reaction mass during the formation of the zeolite, producing a finely divided diluted vanadium zeolite which is then treated as described above. These contact masses are very efficient.

Before use, the contact mass may be more or less completely dehydrated with the formation of a pseudomorphic zeolite which retains its porous physical structure, and, consequently, the catalytic activity which is brought about by this structure and the overall catalytic efficiency remains substantially unaffected.

200 l. of the above described contact masses are filled into a converter and 7 per cent burner gases are passed over them at an average temperature of 450° C. and at a speed of from 200–250 c. b. m. per hour, which represents a loading of from 35 to 66.5 per cent in excess of that commonly used. Good yields of $SO_3$ are obtained after catalysis has once set in.

Example 2.

(1) 16.2 parts $V_2O_5$ and 10.2 parts 100% KOH are dispersed in 300 parts of water, heated to boiling and a vigorous current of sulphur dioxide is passed through. The color of the solution changes through green to blue and a partial bluish-white precipitate of potassium vandyl sulfate results. The excess $SO_2$ is removed by boiling and potassium hydroxide is cautiously added until the vanadite is formed and the precipitate dissolves up to a clear brown solution.

(2) 19 parts of chrome alum are treated with just sufficient KOH to dissolve the precipitate which forms at first to a clear solution.

(3) 160 parts of potassium silicate of 39° Bé. are diluted with 1000 parts of water and 80 parts of celite are thoroughly stirred in.

Solutions of 1 and 2 are poured into 3 in rapid succession and the mixture is gently warmed with vigorous agitation. The mass first solidifies to a gel, which is transformed, by further stirring, into granular, easily filtrable aggregates.

The mixture is allowed to stand, decanted, pressed to remove the excess water, and washed with cold water until the filtrate is colorless. The press cake is then dried at temperatures below 100° C. The potassium-chrome-vanadyl-zeolite, thus produced, is broken into pieces and hydrated in the usual manner. The zeolite is then treated with a dilute solution containing molecular proportions of silver nitrate and copper sulfate by permitting the solution to trickle over the zeolite and continuing the treatment until the base exchange is practically complete. A second washing with water then follows.

The copper-silver-chrome-vanadyl-zeolite is then treated with a dilute solution containing molecular equivalents of potassium vanadate and potassium tungstate. The treatment may advantageously be effected by trickling the solution over the zeolite and should be followed by thorough washing and drying at a temperature of about 90° C.

The product may be considered as a diluted vanado-tungstate of the silver-copper-chrome-vanadyl-zeolite. Preferably, the zeolite is subjected to a short preliminary treatment with burner gases and is then used as a contact for the oxidation of 7% burner gases at an axerage temperature of 450° C. The gas velocity may be up to 125 c. b. m. per hour for 100 l. of contact masses and the yields of $SO_3$ are good. The pseudomorphs of these zeolites may also be used and give excellent yields.

Example 3.

(1) 1 mol of $V_2O_5$ is stirred with a little concentrated sulphur acid to form a paste, small amounts of water are added with heating and a rapid stream of $SO_2$ is passed through the hot fluid until a clear, blue solution is formed. The excess $SO_2$ is then removed by boiling the solution and a potassium hydroxide solution is added until the brown precipitate which is first formed just dissolves to a clear dark brown liquid.

(2) 1 mol of potassium alum is dissolved in water and is precipitated at the boiling point with ammonia, pressed hot, and the aluminum hydroxide formed brought into solution with a minimum of KOH.

(3) 10 mol of $SiO_2$ in the form of potassium silicate are diluted with 5 times the amount of water and ferric-oxide and silica gel are stirred in until the mass is just stirrable.

Solutions 1 and 2 are then poured into 3 and heated to 65° C. with vigorous agitation and addition of some sulphuric acid. The gel which is formed is transformed into a granular mass which is easily filtered. The product is pressed, thoroughly washed with water until the washed water is practically free from vanadium, and dried at a temperature under 100° C.

The fragmentary mass is again treated with water and a dilute silver nitrate solution is permitted to trickle over it with gentle heating until the solution which flows off shows a constant silver content.

The silver-vanadyl-aluminum-zeolite diluted with iron oxide is washed and treated with a potassium vanadate solution in the cold or with moderate warming and is then again washed and dried. The product which can be considered as the vanadate of the silver-vanadyl-aluminum-zeolite diluted with iron oxide and silica gel, when broken into small fragments constitute an excellent contact mass and permit good yields of $SO_3$ at an average temperature of 440° C. working under a burner gas load more than 40% greater than that usually used for a vanadium contact mass.

The zeolite can be dehydrated before or after treatment with the postassium vanadate solution and in its pseudomorphic form, retains its effectiveness unchanged.

*Example 4.*

(1) 1 mol of ammonium vanadate in aqueous suspension is heated and treated with $SO_2$ until it is transformed into the greenish-blue water-soluble vanadyl sulfite. The excess $SO_2$ is then removed by boiling.

(2) 1 mol of copper sulfate in aqueous solution is treated with sufficient ammonia to form the deep blue cuprammonium sulfate solution.

(3) 10 mol of $SiO_2$ in the form of a sodium silicate solution are diluted with 10 times the amount of water and a mixture of equal parts of iron oxide and celite are stirred in with vigorous agitation until the suspension remains just stirrable.

Solutions 1 and 2 are simultaneously poured into 3 and the mixture is heated to 65° C. with violent agitation. A dark gel is first formed which then goes over into a granular precipitate which is pressed, thoroughly washed out, and then dried and constitutes a sodium-vanadyl-copper-zeolite.

After hydrating in the usual way, the sodium is exchanged for iron by causing a dilute iron chloride solution to trickle over the zeolite and the product is then washed free from iron chloride and treated with a sodium molybdate solution. The product obtained is the molybdate of the iron-vanadyl-copper-zeolite, diluted with iron oxide and celite and is an excellent contact for the oxidation of sulphur dioxide giving good yields under the conditions described in the previous examples.

The use of the zeolite catalyst of the present invention in the catalytic oxidation of sulphur dioxide frequently causes a secondary chemical change in the surface of the catalyst and a similar change may take place as a result of the preliminary treatment to which the catalysts may be subjected before they are used for oxidizing sulphur dioxide. For some purposes it may also be desirable to bring about surface changes on the catalysts such as, for example, surface silicification by treatment with water glass solutions where the catalysts would otherwise not be sufficiently strong mechanically or would tend to crumble. It should be understood that the present invention is in no sense limited to catalysts which have an unchanged surface and on the contrary, catalysts which have suffered secondary changes particularly at the surface due to use or to special preliminary treatments are specifically included within the scope of the claims.

Having thus described our invention, what we desire to secure by Letters Patent of the United States and claim is:

1. The process of catalytically oxidizing sulphur dioxide which comprises passing gases containing sulphur dioxide and oxygen at an elevated temperature over a catalyst comprising a zeolite which contains at least one catalytically active elements in non-exchangeable form and is combined with a catalytically active acid radical.

2. The process of catalytically oxidizing sulphur dioxide which comprises passing gases containing sulphur dioxide and oxygen at an elevated temperature over a catalyst comprising a zeolite which contains at least one catalytically active element in non-exchangeable form and is combined with a catalytically active acid radical, at least one of the catalytically active components being an element of the fifth, sixth and seventh groups of the periodic system.

3. The process of catalytically oxidizing sulphur dioxide which comprises passing gases containing sulphur dioxide and oxygen at an elevated temperature over a catalyst comprising a zeolite which contains at least one catalytically active element in non-exchangeable form and is combined with a catalytically active acid radical, at least one of the catalytically active components being vanadium.

4. The process of catalytically oxidizing sulphur dioxide which comprises passing gases containing sulphur dioxide and oxygen at an elevated temperature over catalysts comprising a zeolite containing vanadium in a non-exchangeable form and being combined with a catalytically active acid radical containing vanadium.

5. The process of catalytically oxidizing sulphur dioxide which comprises passing gases containing sulphur dioxide and oxygen at an elevated temperature over catalysts comprising vanadyl zeolites combined with a catalytically active acid radial containing vanadium, the vanadyl radical being present in non-exchangeable form.

6. The process of catalytically oxidizing sulphur dioxide which comprises passing gases containing sulphur dioxide and oxygen at an elevated temperature over a catalyst comprising a pseudomorphous dehydrated zeolite which contains at least one catalytically active element in non-exchangeable form and is combined with a catalytically active acid radical.

7. The process of catalytically oxidizing sulphur dioxide which comprises passing gases containing sulphur dioxide and oxygen at an elevated temperature over catalysts comprising a pseudomorphous dehydrated zeolite containing vanadium in a non-exchangeable form and being combined with a catalytically active acid radical containing vanadium.

8. The process of catalytically oxidizing sulphur dioxide which comprises passing gases containing sulphur dioxide and oxygen at temperatures higher than those at which non-zeolite catalysts containing elements of the fifth, sixth and seventh groups of the periodic system are rapidly deteriorate, but not materially exceeding 600° C., over a catalyst comprising a zeolite which contains at least one catalytically active element in non-exchangeable form and is combined with a catalytically active acid radical.

9. The process of catalytically oxidizing sulphur dioxide which comprises passing gases containing sulphur dioxide and oxygen at temperatures higher than those at which non-zeolite catalysts containing elements of the sixth and seventh groups of the periodic system are rapidly deteriorated, but not materially exceeding 600° C., over a catalyst comprising a zeolite which contains at least one catalytically active element in non-exchangeable form and is combined with a catalytically active acid radical, at least one of the catalytically active components being vanadium.

10. The process of catalytically oxidizing sulphur dioxide which comprises passing gases containing sulphur dioxide and oxygen at an elevated temperature over a catalyst comprising a zeolite which contains at least one catalytically active element in non-exchangeable form and is combined with a catalytically active acid radical, the zeolite also containing catalytically active bases in exchangeable form.

11. The process of catalytically oxidizing sulphur dioxide which comprises passing gases containing sulphur dioxide and oxygen at an elevated temperature over catalysts comprising zeolites containing at least one catalytically active element in non-exchangeable form and combined with at least one catalytically active radical, the zeolites being admixed with carrier particles to form a physically homogeneous structure.

12. The process according to claim 11, in which the carrier particles are of sub-micronic porosity.

13. The process according to claim 11, in which the carrier particles contain silica.

14. The process according to claim 1, in which the catalyst is coated onto massive carrier fragments.

Signed at St. Louis, Missouri, this 11th day of February, 1926.

ALPHONS O. JAEGER.
JOHANN A. BERTSCH.